US011113847B2

(12) United States Patent
Connelly et al.

(10) Patent No.: US 11,113,847 B2
(45) Date of Patent: Sep. 7, 2021

(54) CONVERSION OF INFRASTRUCTURE MODEL GEOMETRY TO A TILE FORMAT

(71) Applicant: Bentley Systems, Incorporated, Exton, PA (US)

(72) Inventors: Paul Connelly, Coatesville, PA (US); Raymond B. Bentley, Elverson, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/600,035

(22) Filed: Oct. 11, 2019

(65) Prior Publication Data

US 2020/0118301 A1    Apr. 16, 2020

Related U.S. Application Data

(60) Provisional application No. 62/745,375, filed on Oct. 14, 2018.

(51) Int. Cl.
*G06T 9/00* (2006.01)
(52) U.S. Cl.
CPC .......... *G06T 9/001* (2013.01); *G06T 2210/32* (2013.01); *G06T 2210/36* (2013.01)
(58) Field of Classification Search
CPC . G06T 9/001; G06T 2210/32; G06T 2210/36; G06T 2219/2024; G06T 19/20; G06T 2210/04; G06T 2210/08; G06T 17/005
See application file for complete search history.

(56) References Cited

U.S. PATENT DOCUMENTS 6,326,964 B1 * 12/2001 Snyder .................. G06T 11/001
345/419
6,348,921 B1    2/2002 Zhao et al.
6,897,858 B1 *  5/2005 Hashimoto ............ G06T 9/001
345/419

(Continued)

OTHER PUBLICATIONS

Arne Schilling, "Using gITF for streaming CityGML 3D City Models" Web3D '16: Proceedings of the 21st International Conference on Web3D Technology, Jul. 2016 pp. 109-116. (Year: 2016).*

(Continued)

*Primary Examiner* — Michael Le
(74) *Attorney, Agent, or Firm* — Cesari and McKenna, LLP; James A. Blanchette

(57) ABSTRACT

In example embodiments, techniques are provided for converting geometry of an infrastructure model represented as high-level geometric primitives having a given symbology to low-level primitives, and encoding these low-level primitives into tile contents suited for transmission, and ultimately display upon, on a client device. An architectural split between frontend applications and backend applications may allow conversion of the high level primitives to be performed remote from the client devices by backend applications. Backend applications may be executed on robust hardware devices that execute software in a multi-threaded environment on powerful CPUs. By performing CPU-intensive operations on backend applications, frontend applications on client devices may be required to do little more than submit low-level primitives for rendering on their GPU.

16 Claims, 9 Drawing Sheets

(56) References Cited

U.S. PATENT DOCUMENTS

| | | | |
|---|---|---|---|
| 7,283,135 B1* | 10/2007 | Cote | G06T 19/00 |
| | | | 345/428 |
| 7,519,603 B2 | 4/2009 | Parker | |
| 9,865,085 B1 | 1/2018 | Eng et al. | |
| 2008/0270529 A1* | 10/2008 | Cavagna | G06T 17/005 |
| | | | 709/203 |
| 2013/0016108 A1 | 1/2013 | Isozu | |
| 2013/0325903 A1 | 12/2013 | Rohlf et al. | |
| 2014/0274154 A1 | 9/2014 | Rana et al. | |
| 2015/0358633 A1 | 12/2015 | Choi et al. | |
| 2015/0363969 A1* | 12/2015 | Yang | G06T 7/507 |
| | | | 345/422 |
| 2016/0239660 A1 | 8/2016 | Azvine et al. | |
| 2017/0084043 A1* | 3/2017 | Khandelwal | G06T 1/60 |
| 2017/0206648 A1* | 7/2017 | Marra | G01C 21/20 |
| 2017/0309027 A1 | 10/2017 | Kleen et al. | |
| 2017/0315696 A1* | 11/2017 | Jacobson | H04L 12/2809 |
| 2017/0372509 A1* | 12/2017 | Paltashev | G06T 15/005 |
| 2019/0108245 A1 | 4/2019 | Bentley et al. | |
| 2019/0163349 A1* | 5/2019 | Derner | G06F 16/904 |
| 2019/0311535 A1* | 10/2019 | Lacey | G06T 17/005 |
| 2020/0058169 A1 | 2/2020 | Friesenhahn et al. | |

OTHER PUBLICATIONS

"Notification of Transmittal of the International Search Report and the Written Opinion of the International Searching Authority, or the Declaration," International Filing Date: Oct. 10, 2019, International Application No. PCT/US2019/055512, Applicant: Bentley Systems, Incorporated, dated Feb. 7, 2020, pp. 1-14.
Westerteiger, Rolf, et al., "Remote GPU-Accelerated Online Preprocessing of Raster Maps for Terrain Rendering," Virtuelle und Erweiterte Realitaet-9, Workshop der GI-Fachgruppe VR/AR 2012, Duesseldorf, Germany, 2012, pp. 1-12.
Erikson, Carl, et al., "HLODs for Faster Display of Large Static and Dynamic Environments," ACM, Proceedings of the 2001 Symposium on Interactive 3D Graphics, I3D'2001, Research Triangle Park, NC, USA, Mar. 1, 2001, pp. 111-121.
Martin, Ioana M., "Adaptive Rendering of 3D Models Over Networks Using Multiple Modalities," IBM Research Division, IBM Research Report, Computer Science/Mathematics, RC 21722 (Log 97821), Apr. 11, 2000, pp. 1-11.
"Notification of Transmittal of the International Search Report and the Written Opinion of the International Searching Authority, or the Declaration," International Filing Date: Oct. 10, 2019, International Application No. PCT/US2019/055569, Applicant: Bentley Systems, Incorporated, dated Dec. 17, 2019, pp. 1-16.
Park, Jong-Seung, et al., "Hierarchical Contribution Culling for Fast Rendering of Complex Scenes," Springer-Verlag Berlin Heidelberg, Advances in Image and Video Technology. PSIVT, Dec. 2006. Lecture Notes in Computer Science, vol. 4319, 2006, pp. 1324-1333.
Rischbeck, Thomas, et al., "A Scalable, Multi-User VRML Server," IEEE, IEEE Computer Society, Proceedings of the IEEE Virtual Reality 2002 (VR'02), Los Alamitos, California, Mar. 24-28, 2002, pp. 199-206.
Schneider, Bengt-Olaf, et al., "An Adaptive Framework for 3D Graphics Over Networks," Elsevier Science, Ltd., Pergamon, Computers & Graphics, IMC'98, vol. 23, No. 6, Dec. 1999, pp. 867-874.
Teler, Eyal, et al., "Streaming of Complex 3D Scenes for Remote Walkthroughs," Blackwell Publishers, The Eurographics Association and Blackwell Publishers, Eurographics 2001, vol. 20, No. 3, Sep. 4, 2001, pp. 1-9.
Bentley et al., U.S. Appl. No. 16/559,057 for "Techniques for Decoupling Access To Infrastructure Models", filed Sep. 3, 2019, 26 pages.
Bentley et al., U.S. Appl. No. 16/598,593 for "Efficient Refinement of Tiles of a HLOD Tree", filed Oct. 10, 2019, 35 pages.
Bhatia et al., "glTF Specification", KhronosGroup, Jun. 9, 2017, 79 pages.
Cozzi, Patrick, "Cesium 3D Tiles", Aug. 19, 2015, 14 pages.
Cozzi et al., "3D Tiles Specification 1.0", Cesium and Open Geospatial Consortium, Jun. 5, 2018, 127 pages.
Erikson et al., "HLODs for Faster Display of Large Static and Dynamic Environments", Department of Computer Science, University of North Carolina at Chapel Hill, Mar. 1, 2001, 11 pages.

* cited by examiner

FIG. 8

- HEADER 810
  - FORMAT ID 814
  - FORMAT VERSION 816
  - VOLUME 818
  - CHORD TOLERANCE 819
  - NUMBER OF ELEMENTS INCLUDED 822
  - NUMBER OF ELEMENTS EXCLUDED 824
  - FLAGS (CURVED GEOMETRY, SOME GEOMETRY) 826
  - LENGTH 828
- FEATURE TABLE 840
- SCENE 820
- DATA STORE 830

CONVERSION OF INFRASTRUCTURE MODEL GEOMETRY TO A TILE FORMAT

RELATED APPLICATIONS

Priority is claimed to previously filed U.S. Provisional Patent Application No. 62/745,375 filed on Oct. 14, 2018 for CONVERSION OF INFRASTRUCTURE MODEL GEOMETRY TO A TILE FORMAT by Connelly et al., the contents of which are incorporated herein by reference in their entirety.

BACKGROUND

Technical Field

The present disclosure relates generally to infrastructure modeling, and more specifically to the display of views of infrastructure models utilizing tiles.

Background Information

Throughout the design, construction and operation of infrastructure (e.g., buildings, factories, roads, railways, bridges, electrical and communications networks, etc.) it is often desirable to model the infrastructure using infrastructure modeling applications. Infrastructure modeling applications traditionally have used a variety of different technologies and data formats to maintain infrastructure descriptions for different phases of the project. In the past, infrastructure models maintained according to such formats have been disjointed, and have included substantial data redundancies and other sources of inefficiency. The models may have been optimized and adapted for particular use cases, without much regard for other phases of the infrastructure project, leading to distinct product/discipline/phase data silos.

More recently, systems have been developed that can break down such existing product/disciple/phase data silos and enable the generation of a true "digital twin" of real-world infrastructure that describes aspects of infrastructure in a unified manner. Generation of this sort of "digital twin" has addressed many of the limitations of traditional infrastructure modeling techniques. However, it has also lead to technical challenges.

One of these challenges involves how to efficiently display a view of an infrastructure model on a client device. Since client devices may lack processing and storage capabilities for generating views themselves, they may instead rely upon cloud computing devices to "publish" the model. In traditional model "publishing," the cloud computing devices may generate a set of all possible tiles (e.g., two-dimensional (2D) or three-dimension (3D) tiles) that represent portions of the infrastructure model at different LODs. Such tile generation may involve converting geometry of the infrastructure model to a form that can be readily displayed on a display screen of a client device. When needed, tiles may be served to client devices, which simply read the supplied tiles and render their contents.

While there are certain existing techniques for converting geometry of some types of infrastructure models to a form that can be readily displayed on a display screen of a client device, such existing techniques suffer a number of shortcomings. For example, techniques have been utilized that have used standard formats like GL Transmission Format (gITF) to represent meshes and tile trees. However, gITF in its standard form does not have the capability to produce certain primitives, such as polylines, including mesh edges. Attempts have been made to extend gITF to allow its tiles to include definitions of polylines and edges as simple line strings, which would be deserialized and tessellated. However, extending gITF has shortcomings. Tessellation of polylines and edges are processing intensive operations that may burden the often limited processing resources of client devices. Client devices may execute their software in a single-threaded environment, utilizing modest central processing units (CPUs). The inherent structure of gITF does not lend itself to use with polylines and edges, and modifications to do so may result in inefficient utilization of storage resources. For example, gITF describes primitives as multiple parallel arrays of binary data (e.g., vertices of a mesh are described by one array for positions, another for colors, a third for normal vectors, each of the same length). If this structure is adapted to store polylines, when a polyline is tessellated, each vertex in each segment of the polyline is repeated three times, resulting in the three parallel arrays that contain significant repeated data. This inefficient use of storage resources may be even worse when tessellating edges of a mesh, as all the vertex data associated with the edges is redundant with that already describing the mesh.

Accordingly, there is a need for improved techniques for converting geometry of an infrastructure model to a format suited for transmission and display on a client device, that better utilizes processing and storage resources.

SUMMARY

Techniques are provided for converting geometry of an infrastructure model (e.g., an iModel® model), represented as high-level geometric primitives (e.g., b-splines, curves, cones, polyfaces, etc.) having a given symbology (e.g., color, line width, material etc.) to low-level primitives (e.g., meshes and polylines), and encoding these low-level primitives into tile contents (e.g., a binary representation) suited for transmission, and ultimately display upon, on a client device. Such techniques may address shortcoming of prior techniques. An architectural split between frontend applications and backend applications may allow conversion of the high level primitives to be performed remote from the client devices by backend applications. Backend applications may be executed on robust hardware devices that execute software in a multi-threaded environment on powerful CPUs. By performing CPU-intensive operations such as polyline tessellation on backend applications, frontend applications on client devices may be required to do little more than submit low-level primitives for rendering on their GPU. Further, all data describing a vertex may be combined into a single lookup table that can be submitted to the GPU of a client device as a texture and sampled within shader code to obtain aspects (e.g., color, position, normal etc.) of the vertex being rendered, minimizing duplication of data. A mesh and all its edges may use the same lookup table. The vertices of a polyline may be expanded into quads simply by repeating the same index into the lookup table rather than repeating all of the data associated with the vertex, further reducing consumption of storage resources (e.g., memory).

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 8 is an example format for encoding tile contents.

DETAILED DESCRIPTION

Figure 1A:
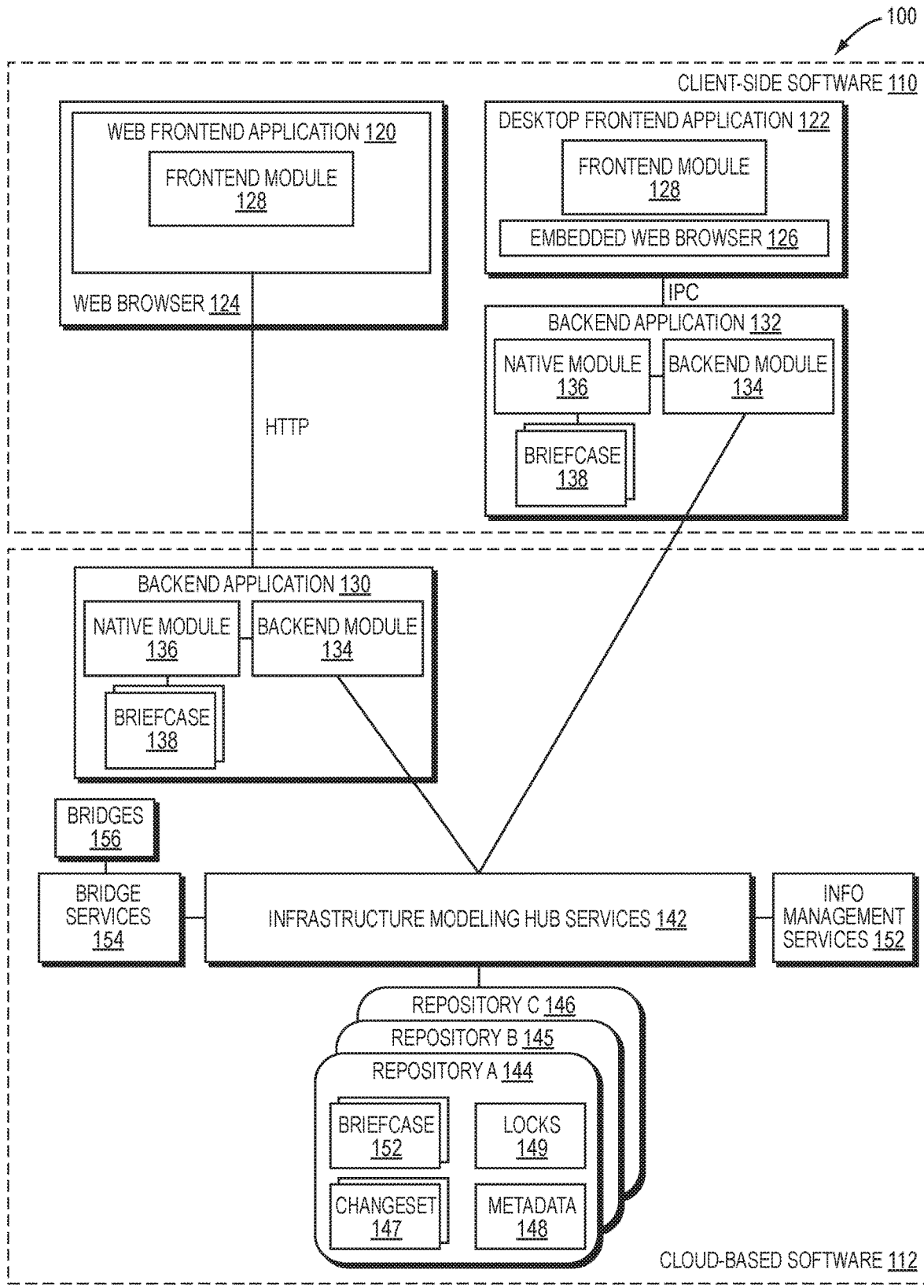
FIG. 1A is a high-level block diagram of an example infrastructure modeling software architecture.

FIG. 1A is a high-level block diagram of an example infrastructure modeling software architecture 100. The architecture may be divided into client-side software 110 that executes on one or more computing devices provided local to an end-user (collectively "client devices") and a cloud-based software 112 that is executed on one or more computing devices provided remote from the end-user (collectively "cloud computing devices"), accessible via a network (e.g., the Internet). The client-side software 110 may include web frontend applications 120 that operate within a virtual environment (e.g., a "browser sandbox") provided by a web browser 124 (e.g., the Chrome® web browser), and desktop front-end applications 122 that operate directly under an operating system, and backend applications 132 that interact therewith. The cloud-based software 112 may include infrastructure modeling hub services (e.g., iModelHub™ services) 142, other services software 152, 154 and backend applications 130 that interact with the web frontend applications 120.

The core of the cloud-based software 112 may be infrastructure modeling hub services (e.g., iModelHub™ services) 142 that provide centralized management and synchronization support to an infrastructure model (e.g., an iModel® model) that serves as a "digital twin" of physical infrastructure. As used herein, the term "infrastructure" refers to a physical structure or object that has been built, or is planned to be built, in the real-world. Examples of infrastructure include buildings, factories, roads, railways, pipe networks, etc. The infrastructure model (e.g., iModel® model) may be a 2D or 3D "digital twin" of such buildings, factories, roads, railways, pipe networks, etc.

Infrastructure modeling hub services (e.g., iModelHub™ services) 142 maintains an infrastructure model (e.g., an iModel® model) in repositories 144-146 that include briefcases 152, a set of accepted changesets 147, metadata 148 (e.g., that includes storage locations, lookup identifiers, sequence information, etc. about the changesets), and locks 149. As used herein, the term "repository" refers to a distributed database. As used herein, the term "briefcase" refers to a particular instance of a database (e.g., a SQLite database). A briefcase may be used as a constituent database of a repository. As used herein, the term "changeset" refers to a persistent record that captures changes needed to transform a particular briefcase from one valid state to a new valid state.

A briefcase 152 in a repository 144-146 may begin as an empty "baseline" briefcase that is programmatically generated and persisted by infrastructure modeling hub services (e.g., iModelHub™ services) 142. A repository 144-146 may be modified by accepting new changesets into the set of accepted changesets 147. As the number of changesets in the set of accepted changesets 147 grows, the time required to take an empty "baseline" briefcase and apply all changesets needed to transform it into a briefcase at a specific version (e.g., the "most recent version") may grow large. For this reason, infrastructure modeling hub services (e.g., iModelHub™ services) 142 may create additional "snapshot" briefcases 152 at different versions. When a specific version (e.g., the "most recent version") of a briefcase is needed, the briefcase 152 closest to such version (which may be a "snapshot" briefcase) is accessed and changesets (or reverse changesets) from the set 147 are applied until a briefcase of the needed version is obtained.

The infrastructure model (e.g., iModel® model) maintained in the briefcases 152 of the repositories 144-146 may be defined utilizing a conceptual schema (e.g., Built Infrastructure Schema (BIS)) and stored using an underlying database schema (e.g., DgnDb).

The infrastructure modeling hub services (e.g., iModelHub™ services) 142 may interact with a number of other services in the cloud, that perform information management and support functions. For example, information management services 152 may manage asset data, project data, reality data, Internet of Things (IoT) data, codes, and other features. Further, bridge services 154 may work together with infrastructure modeling hub services (e.g., iModelHub™ services) 142 to permit interoperation with legacy data sources (not show), incrementally aligning data using source-format-specific bridges 156 that know how to read and interpret source data of legacy formats. A wide variety of additional services (not shown) may also be provided and interact with infrastructure modeling hub services (e.g., iModelHub™ services) 142.

In order to permit access to the infrastructure models (e.g., iModel® models) maintained in the briefcases 152 of the repositories 144-146, backend applications 130, 132 may be provided. As mentioned above, some backend applications 130 may be located in the cloud as part of cloud-based software 112, while others may be located on a client device as part of client-side software 110. The backend applications 130, 132 may maintain local copies of briefcases 138 and changesets needed to transform them into briefcases of a desired version of a repository 144-146. The backend applications 130, 132 may subscribe to notification functions provided by infrastructure modeling hub services (e.g., iModelHub™ services) 142 to receive notifications regarding new changesets in a repository's set of accepted changesets 147. The backend applications 130, 132 may then "pull" (download) the new changeset(s) and apply them to their briefcases 138 to update them to the new version. Similar operations may occur when backend applications 130, 132 modify briefcases 138, to propagate changes.

A backend application 130, 132 may include functionality for servicing requests from frontend applications 120, 122, including requests for initial metadata used to calculate a HLOD sub-tree, and requests for tiles including metadata used to grow the HLOD sub-tree. In response to such requests, the backend application 130, 132 may determine metadata calculate the initial metadata and generate the requested tiles. As part of this tile generation, the backend applications 120, 122 may access local briefcases 138 and converting geometry of the infrastructure model maintained therein to low-level primitives (e.g., meshes and polylines) displayable by the front end applications 120, 122. This and other functionality of the backend application 120, 122 may be implemented by an infrastructure modeling backend module (e.g., iModel.js Backend module) 134 working together with an infrastructure modeling native module (e.g., an iModel.js Native module) 136. The infrastructure modeling backend module may rely upon an infrastructure modeling native module to access briefcases 138.

The frontend applications 120, 122 are concerned mainly with providing a user interface for displaying and enabling user interaction with an infrastructure model (e.g., an iModel® model). Some frontend applications may be web frontend applications 120 that operate within a virtual environment (e.g., a "browser sandbox") provided by a web browser (e.g., the Chrome® web browser) 124 on a client device, while other frontend applications may be desktop front-end applications 122 that execute as stand-alone applications, interacting directly with an operating system of a client device. Desktop front-end applications 122 may include embedded web browser code (e.g., Chromium® code) 126 to permit them to interact with backend applications 132 in a similar manner as web front-end applications 120, with a few exceptions.

Frontend applications 120, 122 may provide functionality for calculating an initial HLOD tree, requesting and displaying specific tiles of the HLOD tree, including rendering the low-level primitives in the tiles, and determining how tiles should be refined to grow the initial HLOD tree using metadata of the tiles, as well as a variety of other functionality. Such functionality may be implemented by an infrastructure modeling frontend module (e.g., iModel.js Frontend module) 128 that sends requests to the infrastructure modeling backend module (e.g., iModel.js Backend module) 134 of a backend application 130, 132. Depending upon whether the frontend application 120, 122 is a web frontend application 120 or desktop front-end application 122, the requests may be sent differently, for example, via a web protocol (e.g., HyperText Transfer Protocol (HTTP)) or via inter-process communication (IPC)).

As discussed above the infrastructure model (e.g., iModel® model) may be structured according to a conceptual schema (e.g., Built Infrastructure Schema (BIS)) and stored in the briefcases 138, 152 using an underlying database schema (e.g., DgnDb). The conceptual schema defines semantics, data structures and concepts used for modeling infrastructure. Physical information may serve as a "backbone", and non-physical information (e.g., analytical information, functional information, informational information etc.) may be maintained relative to (e.g., augmenting) the "backbone." Elements, models, element aspects and relationships may serve as building blocks of the conceptual schema. In this context, the finest-grained record that can be individually identified and locked is the element, which represents (i.e. models, in a colloquial sense of the term) an entity in the real-world. A set of closely-related elements may represent a complete object. One element may be the "lead" element, based on the nature of the object being modeled. Other elements typically relate back the lead element. A model is a container for a set of elements where the set of elements collectively represent (i.e. "model", in a colloquial sense of the term) an entity in the real-world. The model owns the elements that it contains and provides context for the elements. Each element is contained in a single model. Every model "models" some element (that is not contained in that model), with the exception of a repository model, that operates similar to a table of contents. Models may be arranged according to a model hierarchy to support modeling from multiple perspectives. A single repository model may serve as a root of the model hierarchy. A relationship is a connection that relates two or more elements, element aspects or models. Examples of relationships include parent-child relationships that imply ownership and peer-to-peer relationships that define groups or interconnections. In one embodiment, two types of relationships may be provided, with an abstract relationship prohibiting instantiations but permitting inheritance therefrom, and a sealed relationship prohibiting inheritance. Likewise, an element aspect describes a set of properties that belong to a particular element, but that may have an independent lifecycle (e.g., may come and go over the lifetime of an element). An element aspect is typically not individually identifiable and lacks incoming relationships other than from the element that owns it.

Figure 1B:
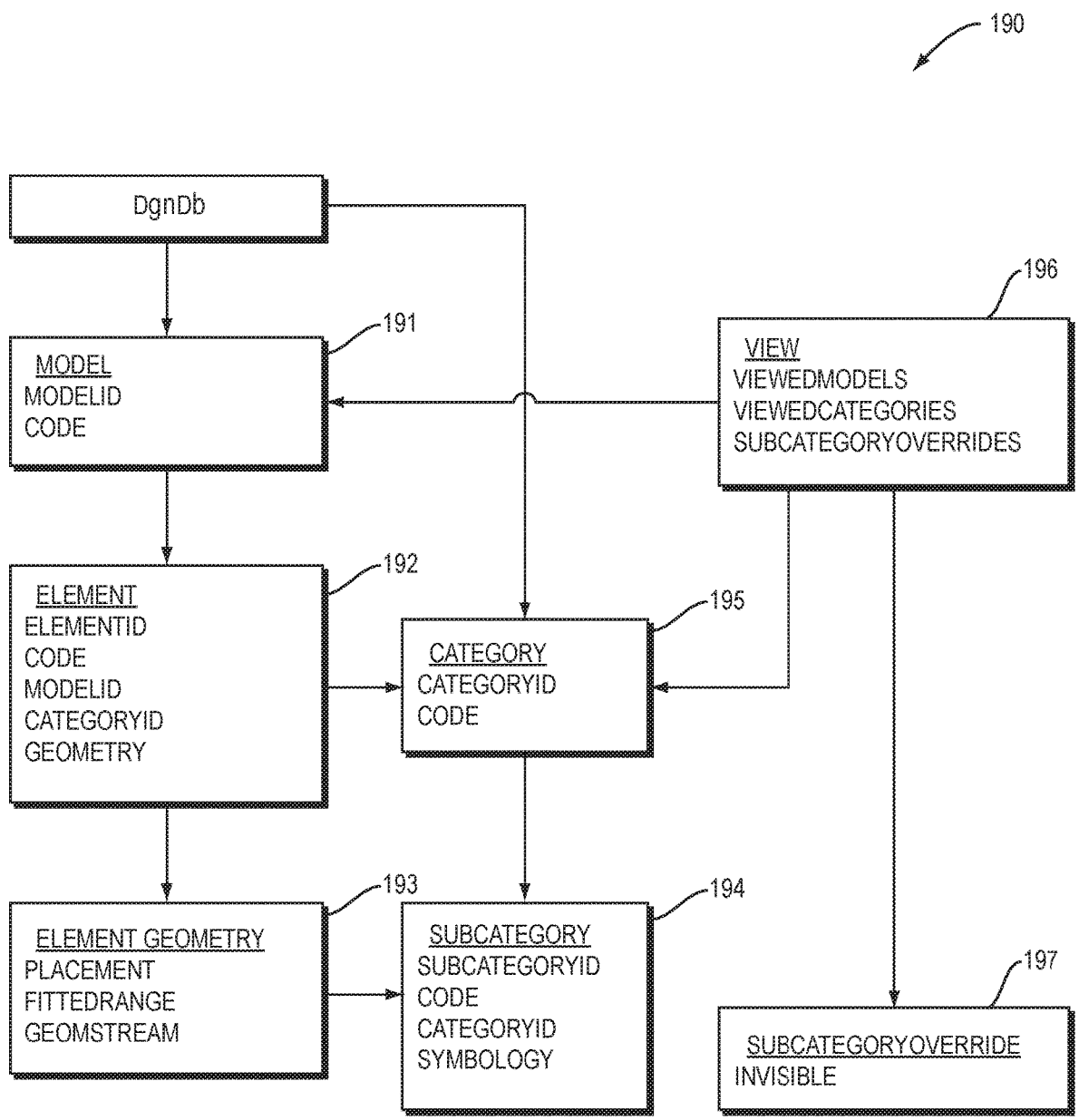
FIG. 1B is a portion of an example database schema that may be used with the briefcases of the infrastructure modeling software architecture of FIG. 1A.

The underlying database schema (e.g., DgnDb) defines individual tables and columns and rows of tables (e.g., SQLite tables) used by briefcases 138, 152. FIG. 1B is a portion of an example database schema 190 that may be used with the briefcases 138, 152 of the infrastructure modeling software architecture 100 of FIG. 1A. In the database schema 190, rows of a model table 191 represent models. Model table columns may include a model ID and a code column. An element table 192 may include rows that represent elements. Element table columns may include an element ID column, a code column, a model ID column (e.g., referencing a row of the model table 190), a category ID column (e.g., referencing a row of the category table 195), and a geometry column (e.g., referencing a row of an element geometry table 193). Rows of the element geometry table 193 may represent geometry aspects of the referencing element. Columns of the element geometry table 193 may include placement columns, size columns, and a geometry stream. The geometry stream may contain a definition of geometry as a collection of high-level geometric primitives (e.g., b-splines, curves, cones, polyfaces, etc.). Element geometry table rows may reference one or more rows of a subcategory table 194. Rows of the subcategory table 194 may represent subcategories. Columns of the subcategory table 194 may include a subcategory ID column, a code column, a category ID column (referencing a row of the category table 195), and symbology columns that represent characteristics (e.g., color, line width, material, etc.) with which the high-level geometric primitives should be rendered. Rows of the category table 194 may represent categories. Columns of the category table 194 may include an element ID column, and a code column. Further, rows of a view table 196 may represent graphical views. Columns of the view table 196 may include a viewed models column (e.g., referencing one or more rows of the model table 192), a viewed categories column (e.g., referencing one or more rows of the category table 194), and a subcategory override column (e.g., by referencing one or more rows of a subcategory override table 197).

The above described infrastructure modeling software architecture 100 and schemas may be used in infrastructure model display techniques that involve frontend-driven, incremental HLOD sub-tree creation and dynamic generation of tiles. An infrastructure modeling frontend module (e.g., a iModel.js Frontend module) 128 of a frontend application 120, 122 incrementally creates a local HLOD sub-tree (e.g., an oct-tree, quad-tree, or another type of tree having nodes corresponding to tiles) based on initial metadata provided without tile contents, and refined based on metadata provided with tile contents from an infrastructure modeling backend module (e.g., a iModel.js Backend module) of a backend application 134 of the backend application 130, 132. The infrastructure modeling backend module 134 may not maintain an HLOD tree, and simply generates tiles upon request, serving them and storing them in a tile cache incase they are needed again.

As part of the tile generation by the infrastructure modeling backend module (e.g., a iModel.js Backend module), improved techniques may be employed for converting geometry of an infrastructure model (e.g., an iModel® model), represented as high-level geometric primitives (e.g., b-splines, curves, cones, polyfaces, etc.) having a given symbology (e.g., color, line width, material etc.) in a briefcase 138 to low-level primitives (e.g., meshes and polylines), and encoding these low-level primitives into tile contents (e.g., a binary representation) suited for transmission, and ultimately display upon, on a client device. Such techniques may address shortcoming of prior techniques, including limitations to their understanding of complex geometric representations, and consumption of excessive resources (e.g., processing resources, storage resources, network resources, etc.). As used herein the term "polyline", refers to a primitive that consists of one or more sets of two or more points, wherein each set is connected end-to-end forming a line string. Likewise, a "mesh" refers to a primitive that consists of a set of triangles that approximate a possibly-curved surface, along with a representation of the edges of the surface. An edge of a mesh may be a "hard edge", namely, a set of line segments connecting two vertices of the surface, "a silhouette edge", namely, an edge of curved portions of the mesh defined as a set of line segments connecting two vertices of the surface (each accompanied by a surface normal vector by which visibility of the edge is controlled), or an "edge chain", namely, a set of polylines connecting two or more vertices of the surface.

Figure 2:
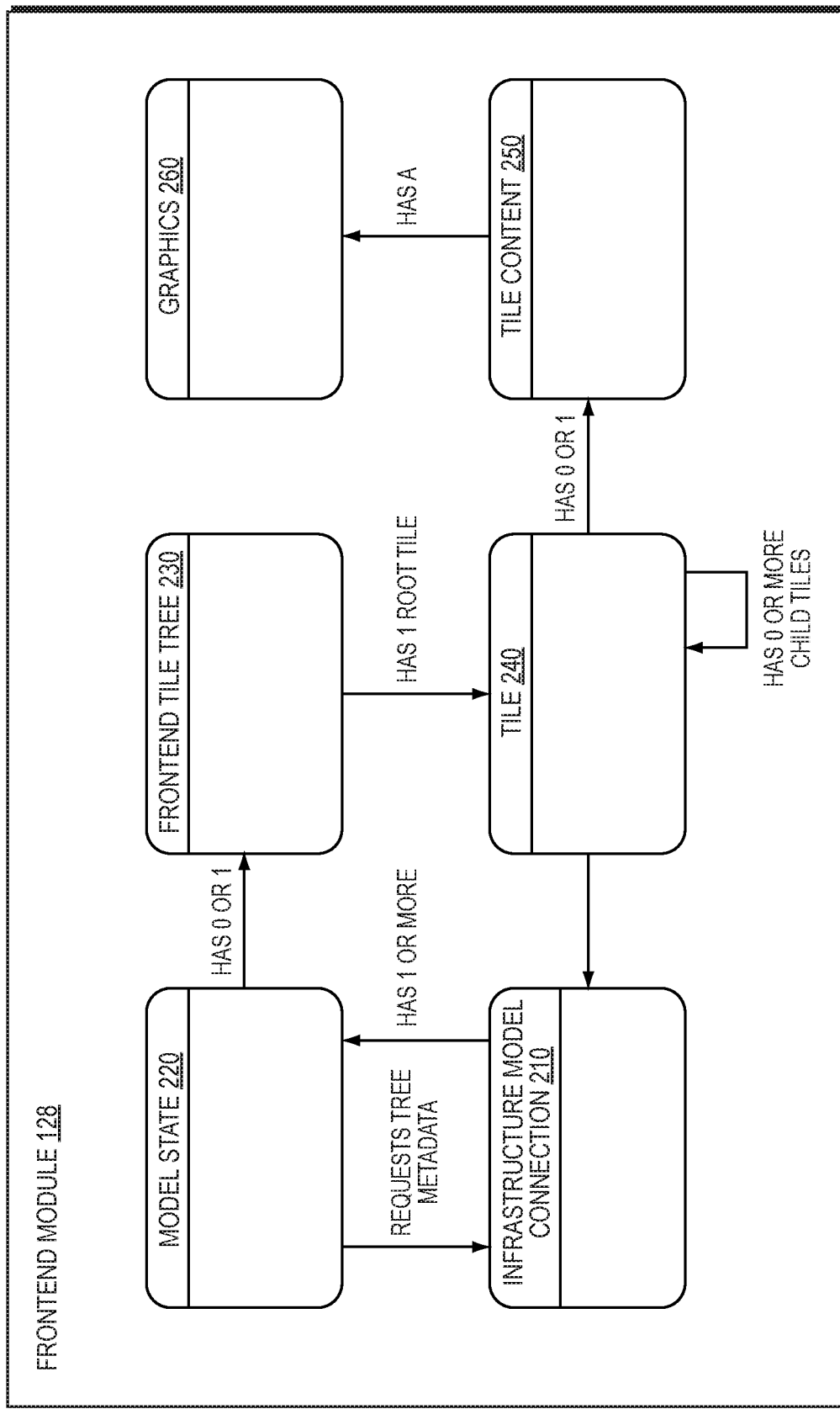
FIG. 2 is a block diagram of example software classes of an infrastructure modeling frontend module that may be executed as part of a frontend application on a client device.

FIG. 2 is a block diagram of example software classes of an infrastructure modeling frontend module (e.g., iModel.js Frontend module) 128 that may be executed as part of a frontend application 120, 122 on a client device. An infrastructure model connection object 210 may include an application program interfaces (API) for making a connection with a briefcase 138 managed by an infrastructure modeling backend module 134 and requesting information therefrom. An infrastructure model connection object 210 may have one or more model state objects 220 that maintain a front-end representation of the infrastructure model, and contain APIs for obtaining graphics for rendering its contents on a display screen of the client device. Each model state object 220 may have zero or one frontend tile tree objects 230 that operate as a container for a local HLOD sub-tree.

The frontend tile tree objects 230 may provide an API for obtaining graphics objects for the portion of the infrastructure model that is to be rendered on the display screen of the client device. This may involve determining which tiles intersect at a desired LOD, generating nodes on the HLOD sub-tree as needed, and requesting contents of those tiles from the infrastructure modeling backend module 134, if not already available locally. To this purpose, a frontend tile tree object 230 may maintain location information, a space (e.g., volume) of the HLOD sub-tree, and a tile screen size (e.g., as a number of pixels).

A tile object 240 may represent a node in the local HLOD sub-tree. A tile object 240 may have zero or one tile contents objects 250 that have graphics objects 260 that can be submitted to a rendering system on the client device to draw tile contents on the display screen. It may have no tile content objects 250 until tile contents are requested from the infrastructure modeling backend module 134, which generally occurs the first time the tile needs to be rendered. A tile object 240 may maintain a tile volume. Further, a tile object 240 may maintain a content status indicating availability of contents of the tile. For example, a content status of "not loaded" may indicate no request has yet been made for contents of the tile, a content status of "enqueued" may indicate a request has been made but a response is still being awaited, a content status of "loading" may indicate a response has been received and is being processed, and a content status of "ready" may indicate contents of the tile have been received and stored in a tile content object 250 to be rendered. Further, the tile object 240 may maintain an indication of a refinement strategy that determines when and how to refine the tile.

Figure 3:
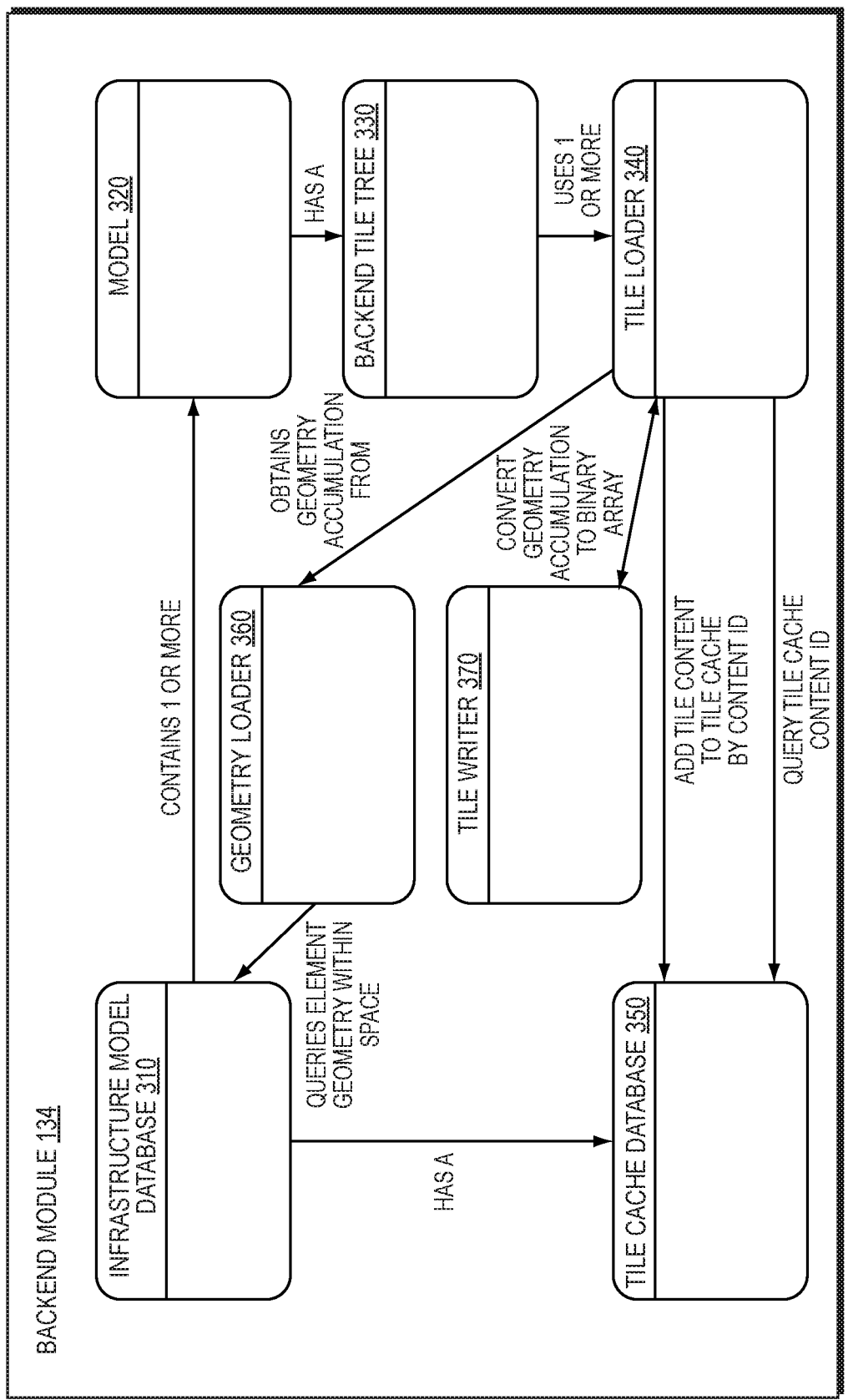
FIG. 3 is a block diagram of example software classes of an infrastructure modeling backend module that may be executed as part of a backend application on a client device or a cloud computing device.

FIG. 3 is a block diagram of example software classes of an infrastructure modeling backend module (e.g., iModel.js Backend module) 134 that may be executed as part of a backend application 130, 132 on a client device or a cloud computing device. An infrastructure modelling database object 310 may provide access to (e.g., hold open) a briefcase 138, which contains one or more models 320. As discussed above, a model owns one or more elements, containing and providing context for them. Each model 320 may have zero or one backend tile tree objects 330 that provide an API for obtaining metadata and tile contents. To this purpose, a backend tile tree object 330 may maintain location information, and a space (e.g., volume) of the portion of the HLOD tree known to the infrastructure model backend module 134.

When contents of a tile are requested, the backend tile tree objects 330 may use one or more tile loader objects to asynchronously obtain tile contents, indexed by an algorithmically-generated content ID. The backend tile tree objects 330 may maintain a set of active tile loader objects 330, and multiple requests for the same tile content may be fulfilled by the same tile tree object 330. Each tile loader object 330 may manage the storage of contents of a tile occupying a tile space (e.g., volume), according to content ID. In operation, a tile loader object 340 may determine whether tile contents are already present in a tile cache of the backend module 134 by querying a tile cache database object 350. If already present, the tile loader object 340 may return the tile contents along with metadata related thereto. If not already present, the tile loader object 340 may call a geometry loader object 360 to obtain a geometry accumulation therefrom. The geometry loader object 360 may operate to query the infrastructure modeling database object 310 to obtain geometry within the space (e.g., volume) of the tile based on a chord tolerance. Such obtained geometry may be in the form of high-level geometric primitives (e.g., b-splines, curves, cones, polyfaces, etc.) having a given symbology (e.g., color, line width, material etc.). The tile loader object 340 may process the high-level primitives to produce low-level primitives (e.g., meshes and polylines) stored as a geometry accumulation that is provided to the tile loader object 340. The tile loader object 340 may call a tile writer object 370 to convert the accumulated geometry (in terms of low-level primitives) into a representation (e.g., a binary representation) that together with metadata form the tile contents. After the conversion, the tile loader object 340 may return the tile contents and metadata related thereto, and also call the tile cache database object 350 to add the contents to the tile cache.

Figure 4:
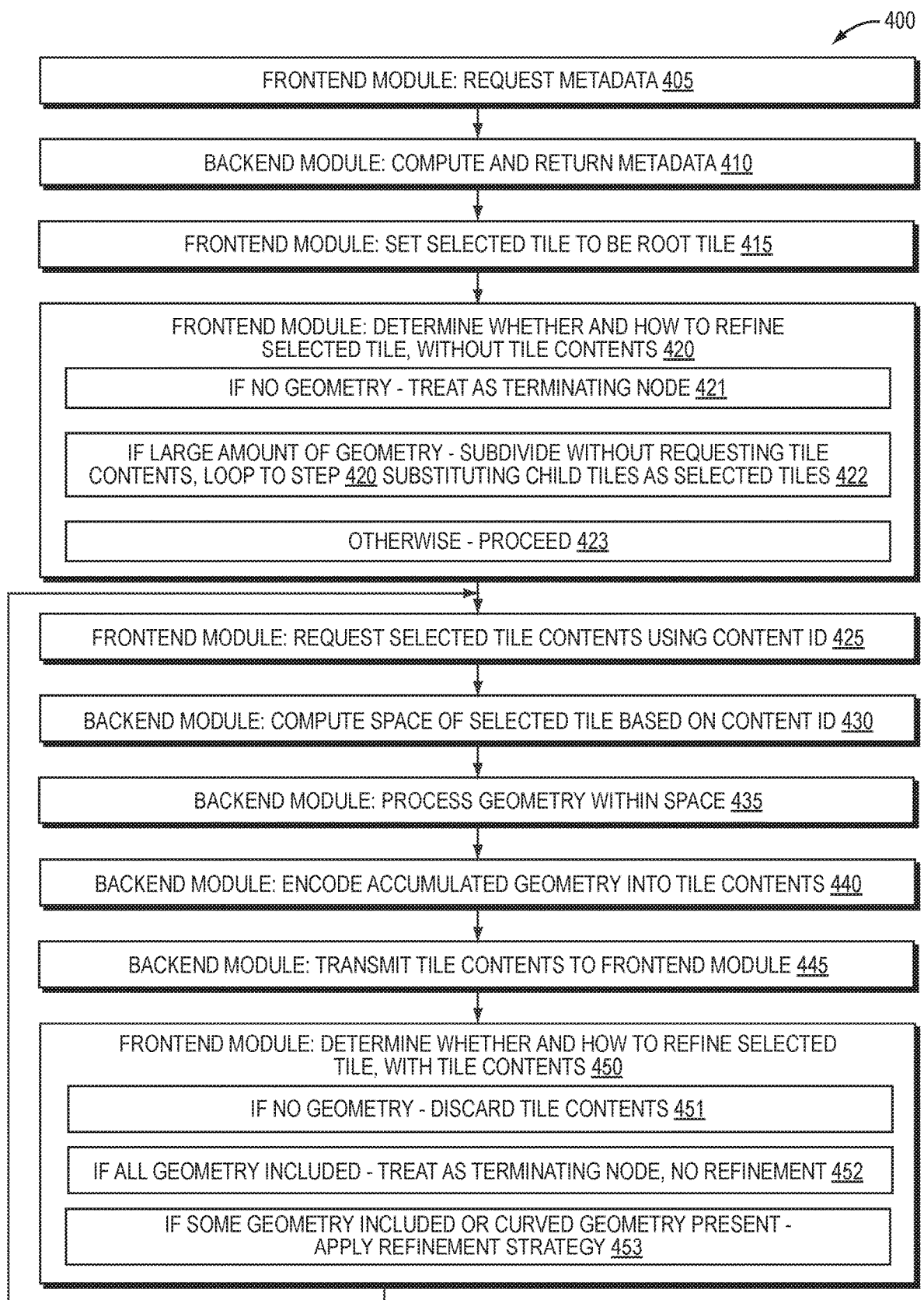
FIG. 4 is a flow diagram of an example sequence of steps for frontend-driven, incremental HLOD sub-tree creation and dynamic generation of tiles to display a view of an infrastructure model (e.g., an iModel® model)

FIG. 4 is a flow diagram of an example sequence of steps 400 for frontend-driven, incremental HLOD sub-tree creation and dynamic generation of tiles (e.g., 2D or 3D tiles) to display a view of an infrastructure model (e.g., an iModel® model). The steps 400 may be implemented by the above discussed objects of the infrastructure modeling frontend module (e.g., iModel.js Frontend module) 128 and infrastructure modeling backend module (e.g., iModel.js Backend module) 134, however the individual objects have been abstracted here to facilitate understanding of overall process flow. At step 405, the infrastructure modeling frontend module 128 on a client device requests metadata for an infrastructure model a view of which is to be displayed on a display screen. At step 410, the infrastructure modeling backend module computes and returns initial metadata, including a space (e.g., volume) occupied by the infrastructure model in the view, and a measure of an amount of geometry contained. The infrastructure modeling frontend module 128 then begins to generate a local HLOD sub-tree.

At step 415, the infrastructure modeling frontend module 128 sets a selected tile to be a root tile and a selected space (e.g., volume) to be the entire space (e.g., volume) occupied by the infrastructure model. At step 420, the infrastructure modeling frontend module 128 determines whether and how to sub-divide the selected tile, without tile contents. At sub-step 421, if the selected tile includes no geometry, the selected tile is treated as a terminating node and nothing further is done. At sub-step 422, if the selected tile includes a measure of geometry greater than a predetermined threshold (e.g., a number of elements processed indicates a "large amount" of geometry), no tile contents are requested and the selected tile is refined using a multiple child tile refinement strategy in which the tile is subdivided into multiple (e.g., 8, 4, etc.) child tiles each occupying a portion of the space (e.g., a sub-volume of the volume) of the tile, and the local HLOD sub-tree is updated to add the additional child tiles. Execution then loops back to step 420, substituting each of the newly created child tiles as the selected tile. Otherwise, at step 423, execution proceeds to where tile contents will be requested.

At step 425, the tile contents for a selected tile generated in the steps above are requested by the infrastructure modeling frontend module 128. To request the selected tile, the infrastructure modeling frontend module 128 algorithmically computes a content ID indicating the tile's position in the local HLOD sub-tree and desired LOD. The content ID serves as the mechanism by which the infrastructure modeling frontend module 128 and infrastructure modeling backend module 134 coordinate their actions, and is a unique identifier within the context of an HLOD tree. Given the full space (e.g., volume) of the HLOD tree, the space (e.g., volume) of the specified tile can be computed using the information contained in the content ID.

At step 430, the infrastructure modeling backend module 134 computes the space (e.g., volume) of the selected tile based on the supplied content ID. At step 435, the infrastructure modeling backend module 134 processes geometry within the space (e.g., volume), retaining geometry that contributes visibly at the LOD, while discarding geometry too small to contribute visibly at the LOD, to produce accumulated geometry, and converts this accumulated geometry from high-level primitives to low level primitives. Simultaneous to such operations, metadata is accumulated. The metadata may include a measure of geometry (e.g., a number of elements processed and a number of elements skipped), an indicator of curved geometry (e.g., its presence or lack thereof), and an indicator that some geometry was excluded due to size (i.e. that there was some additional geometry available that was too small to visibly contribute).

At step 440, the accumulated geometry is converted and encoded together with the metadata into tile contents. The tile contents are added to the tile cache at the infrastructure modeling backend module 134.

At step 445, the tile contents are transmitted to the infrastructure modeling frontend module 128. At step 450, the infrastructure modeling frontend module 128 determines whether and how to refine the selected tile given the desired LOD. At sub step 451, if the measure of geometry in tile-specific metadata indicates no geometry is included, the tile may be discarded. At sub step 452, if the measure of geometry in tile-specific metadata indicates all geometry was included, it is concluded that the selected tile is already at a maximal resolution, the tile is marked as a terminating node in the local HLOD sub-tree, and no refinement is performed. At sub step 453, if the measure of geometry in tile-specific metadata indicates some geometry was excluded from the tile contents, or the indicator of curved geometry indicates the presence of curved geometry, the infrastructure modeling frontend module 128 concludes that the selected tile may be displayed at a higher resolution and a tile refinement strategy may be applied. The tile refinement strategy may be a multiple-child tile refinement strategy, in which the tile is subdivided into multiple (e.g., 8, 4, etc.) child tiles each occupying a portion of the space (e.g., a sub-volume of the volume) of the tile and the local HLOD sub-tree is updated to add the multiple child tiles, similar to as in step 422 above. Alternatively, the tile refinement strategy may be a single-tile refinement strategy in which a single child tile is generated occupying the same space (e.g., volume) as the tile, but having a higher resolution than the tile (e.g., a higher number of pixels), and the local HLOD sub-tree is updated to add a single child tile. Execution may then loop back to step 425, substituting a different tile for the selected tile as needed to obtain refined tiles for the desired LOD for the view of the infrastructure model being shown on the display screen of the client device.

Figure 5:
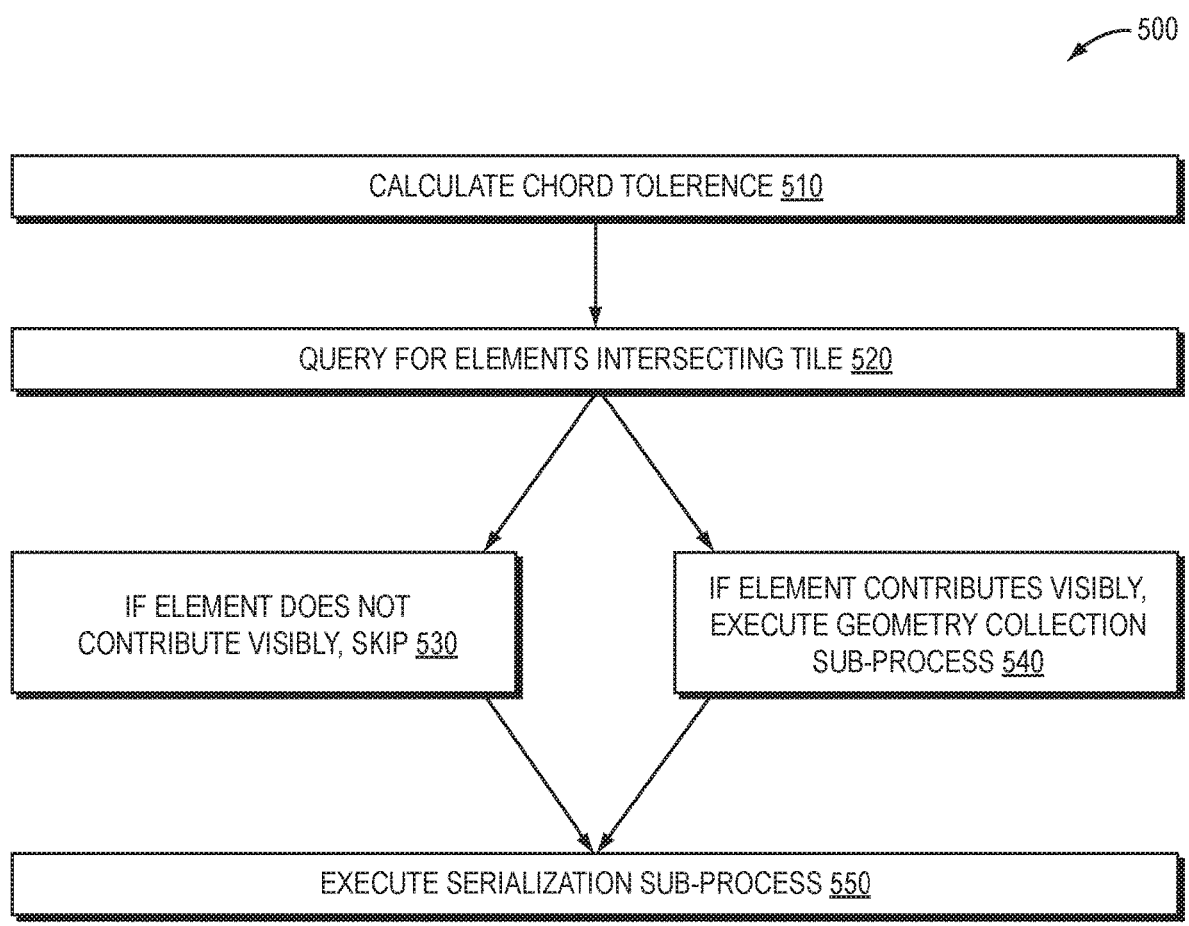
FIG. 5 is a flow diagram of an example sequence of steps that may be executed as part of FIG. 4 to produce accumulated geometry, convert this accumulated geometry from high-level primitives to low level primitives, and encode the result to tile contents (e.g., a binary representation)

FIG. 5 is a flow diagram of an example sequence of steps 500 that may be executed as part of steps 435-440 of FIG. 4 to produce accumulated geometry, convert this accumulated geometry from high-level primitives to low level primitives, and encode the result to tile contents (e.g., a binary representation). LOD may be indicated by tile screen size. At step 510, a chord tolerance for stroking/faceting is calculated based on the tile screen size. At step 520, tables of a briefcase storing the infrastructure model (e.g., iModel® model) are queried for elements intersecting the space (e.g., volume) of the tile. At step 530, for each element, if it occupies a space (e.g., volume) relative to the space (e.g., volume) of the tile that is small enough such that the element would not contribute visibly as indicated by the chord tolerance, the element is skipped. If it occupies a space (e.g., volume) relative to the space (e.g., volume) of the tile such that the element would contribute visibly as indicated by the chord tolerance, a geometry collection sub-process is executed at step 540. Then, at step 550, a serialization sub-process is executed to serialize the geometry collection (of low-level primitives) and metadata describing the geometry within the tile, and encode it into tile contents suitable for transmission (e.g., a binary representation).

Figure 6:
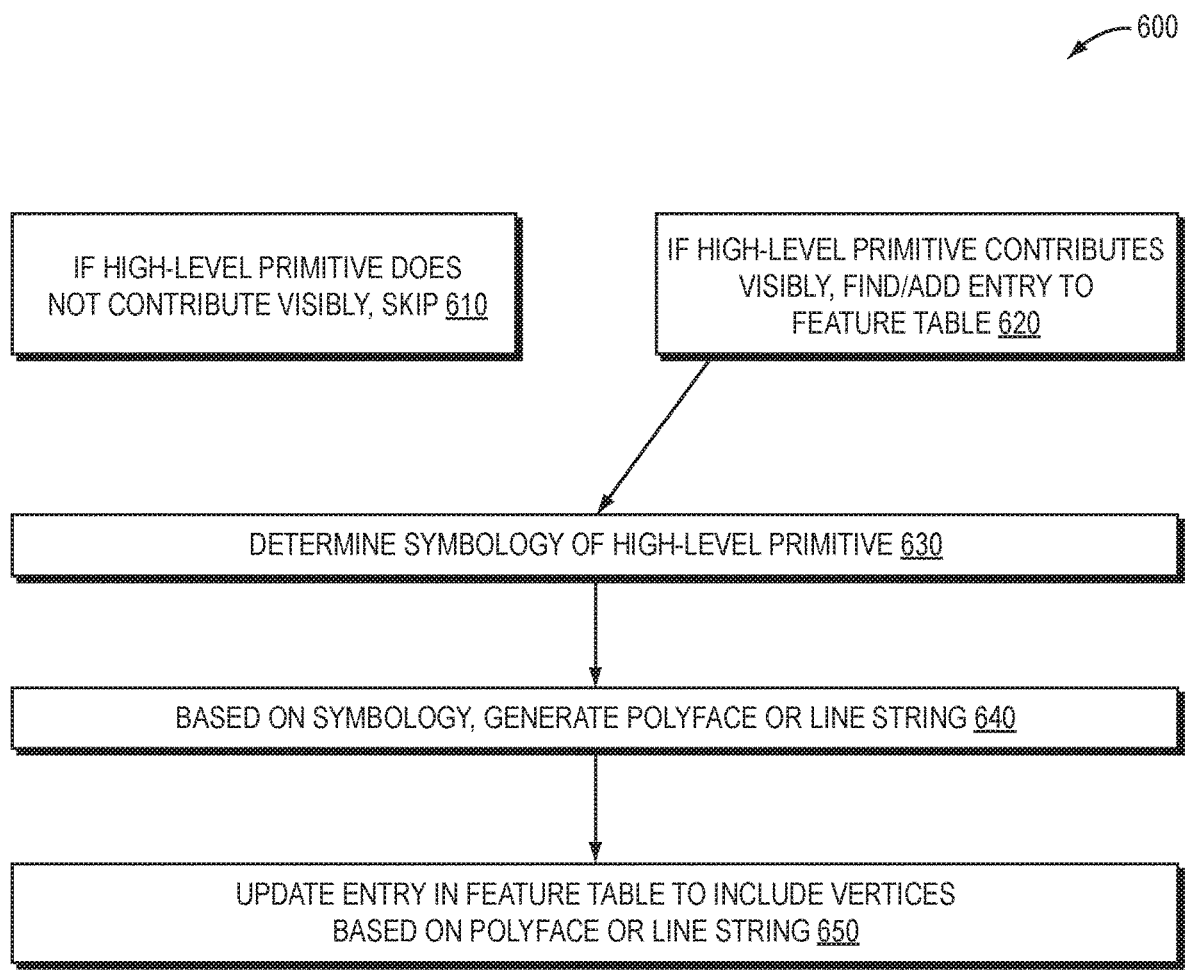
FIG. 6 is a flow diagram of an example sequence of steps that may be executed by a geometry collection sub-process of FIG. 5.

FIG. 6 is a flow diagram of an example sequence of steps 600 that may be executed by the geometry collection sub-process of step 540 of FIG. 5. In general, for a given element, tile volume, and chord tolerance, the geometry collection sub-process iterates the elements geometry, converts it to a set of low-level primitives and adds it to the geometry accumulation. For each high-level geometric primitive in an element's geometry stream, if it occupies a space (e.g., volume) relative to the space (e.g., volume) of the tile that is small enough such that the high-level geometric primitive would not contribute visibly, the element is skipped at step 610. If it occupies a space (e.g., volume) relative to the space (e.g., volume) of the tile such that the high-level geometric primitive would contribute visibly, an existing entry is found, or if none is present, a new entry is added to a feature table of the geometry accumulation at step 620. The feature table is a table that associates vertices in low-level primitives (e.g., meshes or polylines) with a combination of an element ID, subcategory ID and a geometry class. The element ID identifies the element that owns the primitive. The subcategory ID and geometry class serve to categorize subsets of geometry. As part of step 620, an entry is found, or new entry added, that corresponds to the element ID, subcategory ID and geometry class related to the high-level geometric primitive at issue.

At step 630, a symbology of the high-level geometric primitive is determined. At step 640, based on a type of the symbology, a polyface or line string is generated. For example, if it is a polyface, the high-level geometric primitive is decimated according to the chord tolerance. If it is a curve, for an open curve, a line string is generated by stoking to the specified tolerance. If it is a closed curve, a polyface is generated by faceting to the specified tolerance. If the closed curve is planer, and its symbology specifies that its outline should be drawn, a line string is also generated as for an open curve. This sequence may be repeated. At step 650, the entry of the feature table is updated to include a description of vertices of low-level primitives based on the polyface or line. For example, for each polyface that was produced, edges are generated, and clipped to boundaries of the tile space (e.g., volume), which may produce multiple clipped polyfaces. A mesh is determined that is compatible with the symbology. Each vertex of the each clipped polyface is added to the mesh, and associated with the feature table entry, along with indices describing surface triangles and the edges. Likewise, for each line string that was produced, it is clipped to boundaries of the tile space (e.g., volume), which may produce multiple clipped line strings. A polyline is determined that is compatible with the symbology. Each vertex of the each clipped line string is added to the polyline, and associated with the feature table entry, along with indices describing points of each line string.

Figure 7:
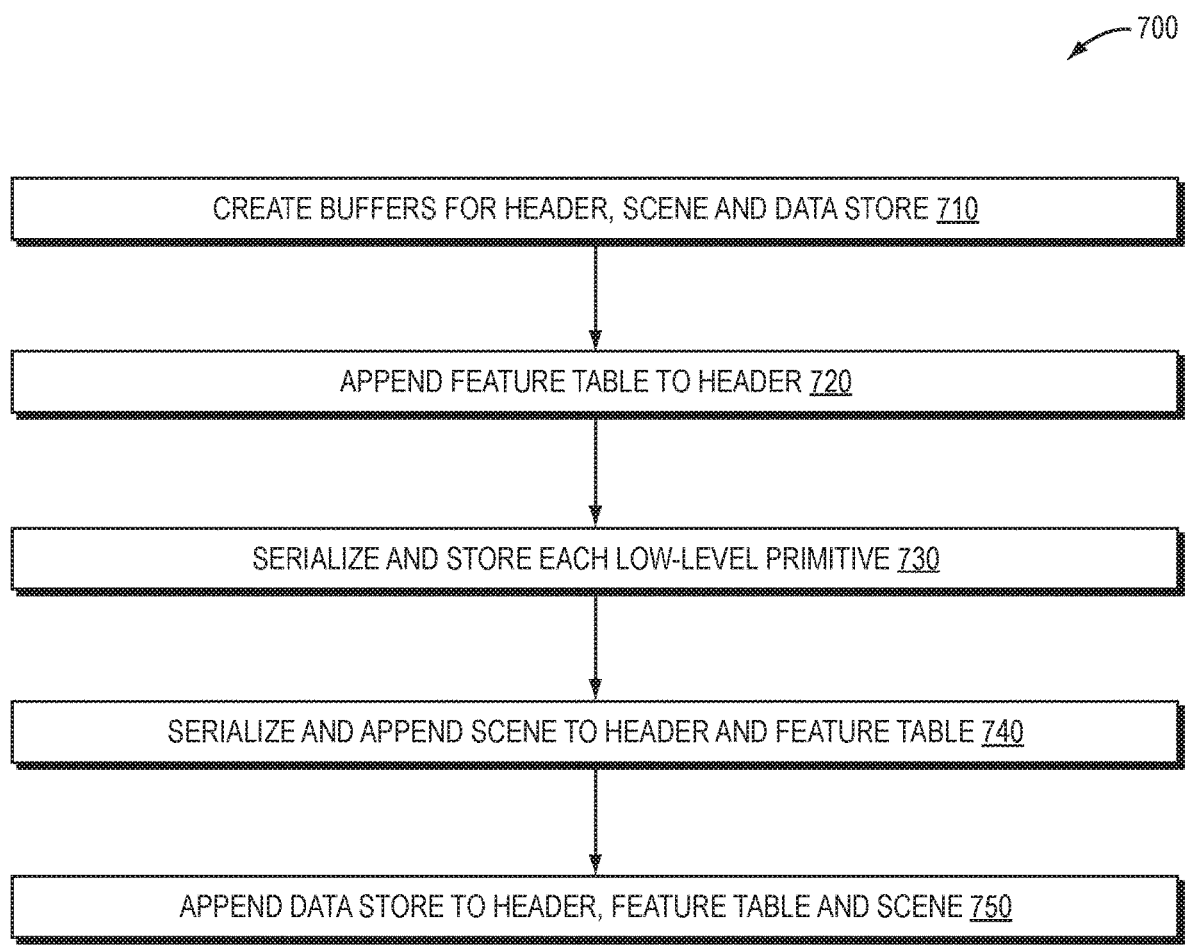
FIG. 7 is a flow diagram of an example sequence of steps that may be executed by a serialization sub-process of FIG. 5.

FIG. 7 is a flow diagram of an example sequence of steps 700 that may be executed by the serialization sub-process of step 550 of FIG. 5. In general, given a geometry accumulation of low-level primitives and metadata describing the geometry within the tile, the serialization sub-process encodes it into tile contents suitable for transmission (e.g., a binary representation). FIG. 8 is an example format 800 for encoding tile contents. At step 710, buffers (e.g., binary buffers) are created to hold data for a header 810, a scene 820 and data store 830. The header 810 includes a format ID 814, a format version 816, a volume 818 that tightly encloses the geometry within the tile (which may be tighter fitting than the tile volume), a chord tolerance 819, a number of elements processed (i.e. included elements that contained at least some geometry large enough to contribute) 822, a number of elements skipped (i.e. excluded elements containing no geometry large enough to contribute) 824, flags 826 providing an indicator of curved geometry and an indicator that some geometry was excluded due to size, and a header length 828. The scene 820 may be a JSON string that describes materials, textures, geometric primitives and the like, and points (e.g., using offsets) to portions of the data store 830 (e.g., binary data). The data store 830 may be provided as contiguous chunks of binary data referenced by the scene 820.

At step 720, a feature table 840 is appended to the buffer of the header 810. As discussed above, the feature table 840 is a table that associates vertices in low-level primitives (e.g., meshes or polylines) with a combination of an element ID, subcategory ID and a geometry class. The feature table 840 may be represented as a length and maximum number of features in the table, and packed feature data that includes the element ID, a subcategory ID table index, and the geometry class for each feature, and a subcategory ID table which stores the actual subcategory IDs.

At step 730, each low-level primitive (e.g., mesh or polyline) is serialized and stored. For example, a representation of the low-level primitive's symbology is added to the buffer holding the scene 820. Vertices of the low-level primitive are encoded to a vertex table by determining a number of bytes required per vertex based on the type of data associated with each vertex, appending data for each vertex (including any color data) in sequence to the buffer holding the data store 830 (e.g., binary data) and creating a pointer to the vertex data. Polylines and mesh edges may be tessellated such that each line segment becomes a quad. Additional triangles may also be inserted in between segments to enable smoothly rounded corners, and indices created to point to each triangle. Additional data may be stored depending on the type of low-level primitive. For example, for polylines, indices of previous and next vertices, a parameter describing how the vertex connects to neighboring vertices and cumulative distance of the vertex along the line string may be stored to the buffer holding the data store 830. For hard edges of meshes, an index of the other endpoint of the line segment and in indication of the corner of the quad to with the vertex is associated may be stored. For silhouette edges of meshes, encoded normals may be stored.

At step 740, the buffer holding the scene 820 is serialized and appended to the buffer holding the header 810 and feature table 840. Finally, the buffer holding the data store 830 is appended to the buffer now holding the header 810, feature table 840 and scene 820 to produce the completed tile contents (e.g., a binary representation) suited for transmission, and ultimately display upon, on a client device.

In summary, techniques are described above for converting geometry of an infrastructure model (e.g., an iModel® model), represented as high-level geometric primitives (e.g., b-splines, curves, cones, polyfaces, etc.) having a given symbology (e.g., color, line width, material etc.) to low-level primitives (e.g., meshes and polylines), and encoding these low-level primitives into tile contents (e.g., a binary representation) suited for transmission, and ultimately display upon, on a client device. It should be understood that a wide variety of adaptations and modifications may be made to the techniques. Further, in general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method comprising:
receiving, by a backend module executing on a remote computing device from a frontend module executing on a local computing device, a request for tile contents of a selected tile that corresponds to a node of a hierarchical level of detail (HLOD) sub-tree that supports a view of a model to be shown by the frontend module;
computing, by the backend module, a space of the selected tile;
processing, by the backend module, geometry within the space of the selected tile by
calculating a tolerance for stroking or faceting at a level of detail (LOD) of the tile;
retaining geometry that contributes visibly at the LOD of the tile as indicated by the tolerance and discarding geometry too small to contribute visibly at the LOD as indicated by the tolerance, to produce an accumulated geometry, and
converting the accumulated geometry from high-level geometric primitives having a symbology to low-level primitives, wherein the high-level geometric primitives are b-splines, curves, cones or polyfaces, the low-level primitives are polylines or meshes, and the symbology is a color, line width or material;
encoding, by the backend module, the geometry into the tile contents; and
transmitting the tile contents to the frontend module on the local computing device to enable the frontend module to display the view of the model on a display screen of the local computing device without the frontend module utilizing high-level geometric primitives.

2. The method of claim 1, wherein the LOD is indicated by a tile screen size, the tolerance is a chord tolerance, the calculating calculates the chord tolerance based on the tile screen size and the processing further comprises:
querying for elements of the model intersecting the space of the selected tile; and
determining whether each element contributes visibly at the LOD based on the chord tolerance.

3. The method of claim 1, wherein the retaining geometry further comprises:
determining the symbology of the high-level geometric primitives;
based on the symbology, generating polyfaces or line strings; and
producing entries of a feature table that include a description of vertices based on the polyfaces or line strings, wherein the entries of the feature table are encoded in the encoding to produce the tile contents.

4. The method of claim 3, wherein the encoding encodes the geometry into a transmittable binary representation.

5. The method of claim 3, wherein the encoding further comprises:
appending entries of the feature table to a header;
serializing detailed data for each low-level primitive into a data store;
serializing and appending a scene describing materials, textures, and/or geometric primitives to the feature table; and
appending the data store to the scene.

6. The method of claim 1, wherein the encoding encodes all data describing a vertex of the geometry into a single table.

7. The method of claim 1, wherein the encoding encodes all data describing a mesh of the geometry and its edges into a single table.

8. The method of claim 1, wherein the model is an infrastructure model that models a physical structure or object that has been built, or is planned to be built, in the real-world.

9. A method comprising:
receiving, by a backend module executing on a remote computing device from a frontend module executing on a local computing device, a request for tile contents of a selected tile that corresponds to a node of a hierarchical level of detail (HLOD) sub-tree that supports a view of a model to be shown by the frontend module;
computing, by the backend module, a space of the selected tile;
processing, by the backend module, geometry within the space of the selected tile, the processing to include converting the geometry from high-level geometric primitives having a symbology to low-level primitives, wherein the high-level geometric primitives are b-splines, curves, cones or polyfaces, the low-level primitives are polylines or meshes, and the symbology is a color, line width or material;
encoding, by the backend module, the geometry into the tile contents that include at least a feature table and a data store that describes the low-level primitives; and
transmitting the tile contents to the frontend module on the local computing device to enable the frontend module to display the view of the model on a display screen of the local computing device without the frontend module utilizing high-level geometric primitives.

10. The method of claim 9, wherein the encoding encodes all data describing a vertex of the geometry into a single table.

11. The method of claim 9, wherein the encoding encodes all data describing a mesh of the geometry and its edges into a single table.

12. A non-transitory electronic device readable medium having instructions stored thereon, the instructions when executed by one or more processors of one or more computing devices configured to:
receive, from a frontend module executing on a local computing device, a request for tile contents of a tile that corresponds to a node of a hierarchical level of detail (HLOD) sub-tree that supports a view of a model to be shown by the frontend module;
compute a space of the tile;
process geometry within the space of the tile by
calculating a tolerance for stroking or faceting at a level of detail (LOD) of the tile;

retaining geometry that contributes visibly at the LOD of the tile as indicated by the tolerance and discarding geometry too small to contribute visibly at the LOD as indicated by the tolerance, to produce an accumulated geometry, and converting the accumulated geometry from high-level geometric primitives having a symbology to low-level primitives, wherein the high-level geometric primitives are b-splines, curves, cones or polyfaces and the low level primitives are polylines or meshes;

encode the geometry into the tile contents; and transmit the tile contents to enable the frontend module to display the view of the model on a display screen of the local computing device.

13. The non-transitory electronic device readable medium of claim 12, wherein the LOD is indicated by a tile screen size, the tolerance is a chord tolerance, the calculating calculates the chord tolerance based on the tile screen size and the instructions when executed are further configured to:

query for elements of the model intersecting the space of the tile; and determine whether each element contributes visibly at the LOD based on the chord tolerance.

14. The non-transitory electronic device readable medium of claim 12, wherein the instructions when executed are further configured to:

determine the symbology of the high-level geometric primitives;

based on the symbology, generate polyfaces or line strings; and produce entries of a feature table that include a description of vertices based on the polyfaces or line strings, wherein the entries of the feature table are encoded to produce the tile contents.

15. The non-transitory electronic device readable medium of claim 14, wherein the instructions when executed are further configured to:

append entries of a feature table to a header;

serialize detailed data for each low-level primitive into a data store;

serialize and append a scene describing materials, textures, and/or geometric primitives to the feature table; and append the data store to the scene.

16. The non-transitory electronic device readable medium of claim 14, wherein the symbology includes color, line width or material.

* * * * *